United States Patent
Nakata et al.

(10) Patent No.: US 6,816,749 B2
(45) Date of Patent: Nov. 9, 2004

(54) METHOD OF AND APPARATUS FOR MANUFACTURING ROLLED MEDIUM PRODUCTS

(75) Inventors: Tomohiro Nakata, Minamiashigara (JP); Takayuki Fujiwara, Minamiashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/014,607

(22) Filed: Dec. 14, 2001

(65) Prior Publication Data

US 2002/0082739 A1 Jun. 27, 2002

(30) Foreign Application Priority Data

Dec. 22, 2000 (JP) ........................................ 2000-389744
Dec. 22, 2000 (JP) ........................................ 2000-389757

(51) Int. Cl.[7] ............................................. G06F 19/00
(52) U.S. Cl. ...................................... 700/115; 700/117
(58) Field of Search ........................ 700/126, 115–117, 700/122; 242/523.1

(56) References Cited

U.S. PATENT DOCUMENTS

| | | | |
|---|---|---|---|
| 5,321,619 A | | 6/1994 | Matsuda et al. |
| 5,768,153 A | * | 6/1998 | Hosono et al. ............... 702/84 |
| 5,896,293 A | * | 4/1999 | Teramoto et al. ........... 700/111 |
| 6,155,025 A | * | 12/2000 | Komiya et al. ............... 53/147 |
| 6,381,509 B1 | * | 4/2002 | Thiel et al. .................. 700/115 |
| 6,516,239 B1 | * | 2/2003 | Madden et al. ............. 700/115 |

FOREIGN PATENT DOCUMENTS

| | | |
|---|---|---|
| EP | 0 497 066 A1 | 8/1992 |
| EP | 0 580 390 A2 | 1/1994 |
| EP | 0 723 390 A2 | 7/1996 |
| EP | 0 907 099 A2 | 4/1999 |

* cited by examiner

Primary Examiner—Albert W. Paladini
Assistant Examiner—R Jarrett
(74) Attorney, Agent, or Firm—Sughrue Mion, PLLC

(57) ABSTRACT

Core data required to manufacture rolls in a film processing and cutting machine are obtained, and core data of cores supplied by a core supply apparatus are also obtained. These core data are compared with each other, and cores having the conforming core data are selected and supplied to the film processing and cutting machine. When supplied with the cores, the film processing and cutting machine winds films cut to a given length and width around respective cores, and then supplies obtained products to a main feed unit according to the sequence of address information established on a film roll.

18 Claims, 18 Drawing Sheets

METHOD OF AND APPARATUS FOR MANUFACTURING ROLLED MEDIUM PRODUCTS

BACKGROUND OF THE INVENTION

1. Field of the Invention

The present invention relates to a method of and an apparatus for manufacturing products in a plurality of types having different specifications.

2. Description of the Related Art

Film manufacturing apparatus, for example, operate by drawing a film blank from a film roll, cutting the film blank transversely and longitudinally into a plurality of films, winding the films around respective cores thereby to produce rolls, and then supplying the rolls to a next process.

The rolls thus manufactured are available in a number of types having different specifications including different core diameters, different roll widths, different film lengths, different winding directions (rolls with inner coated surfaces and rolls with outer coated surfaces), etc. The film manufacturing apparatus are designed to produce a plurality of types of products in a mixed fashion to meet recent demands for the production of products in many types and in small quantities.

It has been desired to supply the film manufacturing apparatus with cores in a suitable component form efficiently and accurately depending on the types of rolls to be manufactured.

Heretofore, product manufacturing apparatus for manufacturing various products by supplying components in different types to intermediate products are designed to check whether such components are defective or not. However, the product manufacturing apparatus are supposed to be supplied with components in appropriate types, and do not perform a matching process for determining whether supplied components match intermediate products or not. Therefore, if some failure is discovered in the process of manufacturing products on the product manufacturing apparatus, then the feed line thereof needs to be shut down, adversely affecting the overall manufacturing process.

Film rolls supplied to the film manufacturing apparatus may possibly contain defective regions and roll-to-roll joints. Positional information representing such defective regions and roll-to-roll joints are supplied from a management apparatus to the film manufacturing apparatus, in which films corresponding to those defective regions and roll-to-roll joints are removed.

In the film manufacturing apparatus, since films are cut in transverse and longitudinal directions and fed successively, desired films cannot be removed unless the sequence in which the films are fed is accurately recognized. Particularly in a system arranged to supply products to a single feed line from a plurality of feed paths, it is extremely difficult to accurately determine which products are to be removed.

SUMMARY OF THE INVENTION

It is therefore an object of the present invention to provide a method of and an apparatus for manufacturing products in a plurality of types having different specifications efficiently by supplying appropriate components to intermediate products.

Another object of the present invention is to provide a method of and an apparatus for manufacturing a plurality of products so as to be able to supply the products in a desired sequence to a feed line.

Still another object of the present invention is to provide a method of and an apparatus for manufacturing products so as to be able to easily and reliably process the manufactured products.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
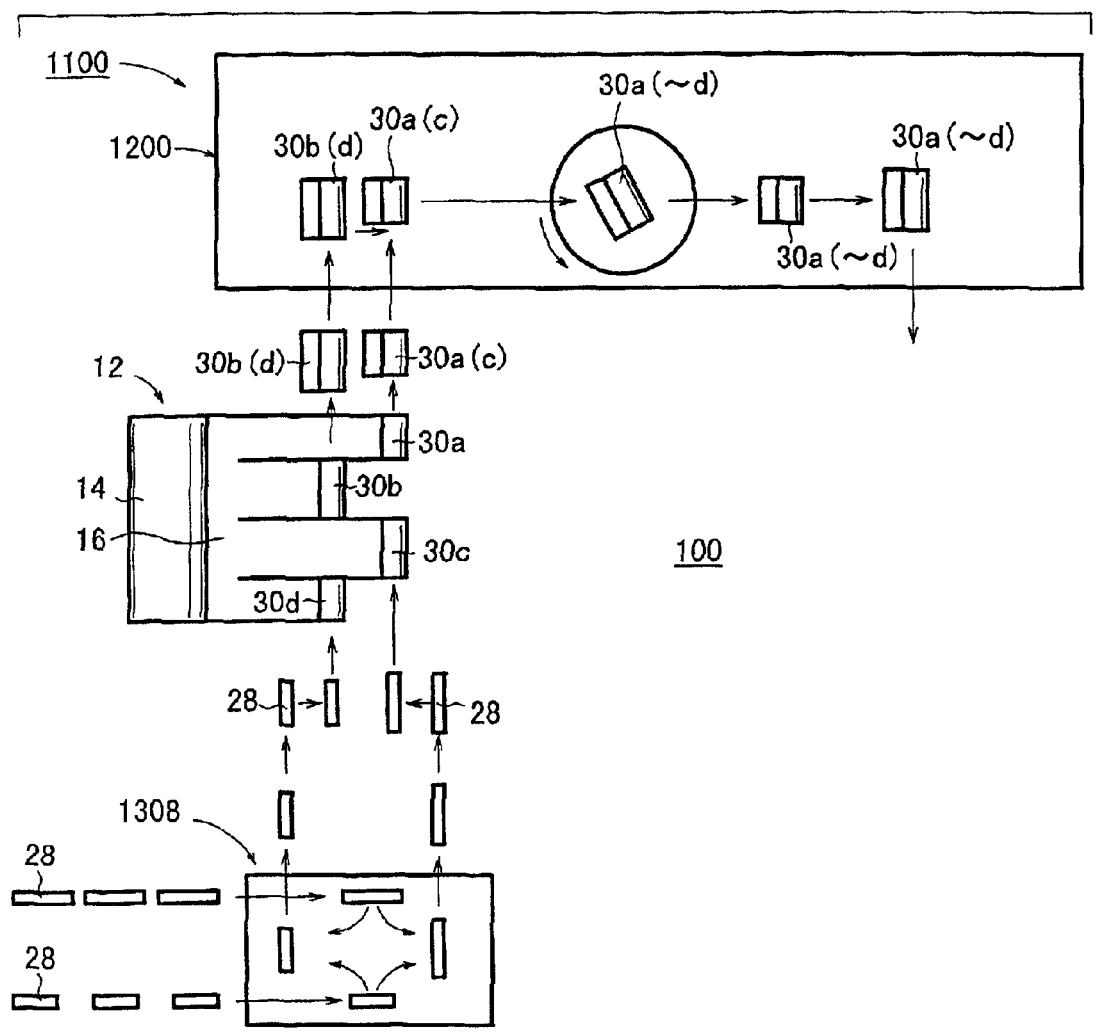
FIG. 1 is a schematic plan view of a roll production line to which a method of and an apparatus for manufacturing products according to the present invention are applied.

FIG. 1 schematically shows in plan a roll production line 100 to which a method of and an apparatus for manufacturing products according to the present invention are applied. The roll production line 100 is basically constructed of a core supply apparatus 1308 for supplying cores 28 of a given length and diameter, a film processing and cutting machine 12 for cutting an elongate raw film (raw web) 16 drawn from a film roll 14 into films and winding the films around cores 28 thereby to produce a plurality of rolls 30a through 30d, and a roll feed mechanism (feed line) 1200 for feeding the produced rolls 30a through 30d. The film processing and cutting machine 12 and the roll feed mechanism 1200 jointly make up a film processing and feeding apparatus 1100.

Figure 2:
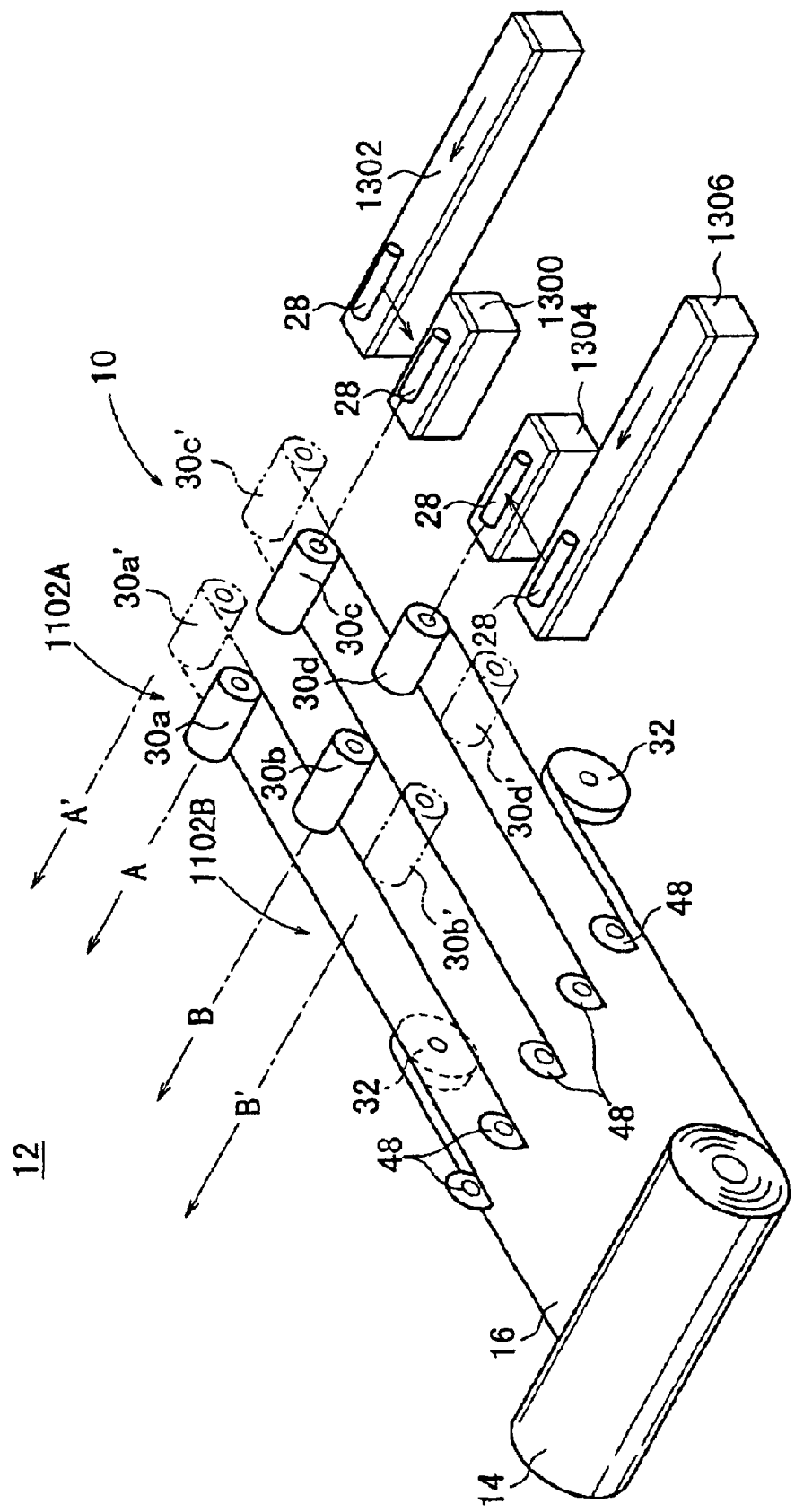
FIG. 2 is a schematic perspective view of a film processing and cutting machine which serves as part of the roll production line shown in FIG. 1.

FIG. 2 schematically shows in perspective a film processing and cutting machine 12 according to a first embodiment of the present invention. The film processing and cutting machine 12 has a plurality of rotary cutters 48 for cutting an elongate film 16 into films having given widths and a cutting means (not shown) for cutting the elongate film 16 to given lengths. The elongate film 16 is unwound from a photosensitive roll (hereinafter referred to as "film roll 14") of a PET (polyethylene terephthalate) film, a TAC (triacetylcellulose) film, a PEN (polyethylene naphthalate) film, or a photographic printing paper used as a base. In a film winding apparatus 10, the severed films 16 are wound around respective cores 28 supplied from the core supply apparatus 1308, thus producing a plurality of rolls 30a through 30d, 30a' through 30d'. Edges 32 of excessive elongate films are produced at opposite sides of the elongate film 16.

The film processing and cutting machine 12 is capable of producing a plurality of types of rolls 30a through 30d, 30a' through 30d' according to a production plan. Specifically, the film winding apparatus 10 has a first winding unit 1102A and a second winding unit 1102B that are spaced from each other by a given distance in the direction in which the elongate films 16 are drawn from the film roll 14. The first winding unit 1102A and the second winding unit 1102B produce the rolls 30a, 30c or 30a', 30c' and the rolls 30b, 30d or 30b', 30d'. The rolls 30a through 30d and the rolls 30a' through 30d' differ from each other as to the direction in which the elongate films 16 are wound. The rolls 30a through 30d and the rolls 30a' through 30d' are available in various types dependent on combinations of widths of the elongate films 16, diameters of the cores 28, and directions in which the elongate films 16 are wound.

A region of the first winding unit 1102A for manufacturing the rolls 30a, 30c will be referred to as an A axis, a region of the first winding unit 1102A for manufacturing the rolls 30a', 30c' as an A' axis, a region of the second winding unit 1102B for manufacturing the rolls 30b, 30d as a B axis, and a region of the second winding unit 1102B for manufacturing the rolls 30b', 30d' as a B' axis.

Alongside of the film winding apparatus 10 of the film processing and cutting machine 12, there are disposed feed mechanisms 1300, 1302 for supplying cores 28 to the first winding unit 1102A and feed mechanisms 1304, 1306 for supplying cores 28 to the second winding unit 1102B. The feed mechanism 1300 supplies cores 28 to the A axis of the first winding unit 1102A, the feed mechanism 1302 supplies cores 28 to the A' axis of the first winding unit 1102A, the feed mechanism 1304 supplies cores 28 to the B axis of the second winding unit 1102B, and the feed mechanism 1306 supplies cores 28 to the B' axis of the second winding unit 1102B.

Figure 3:
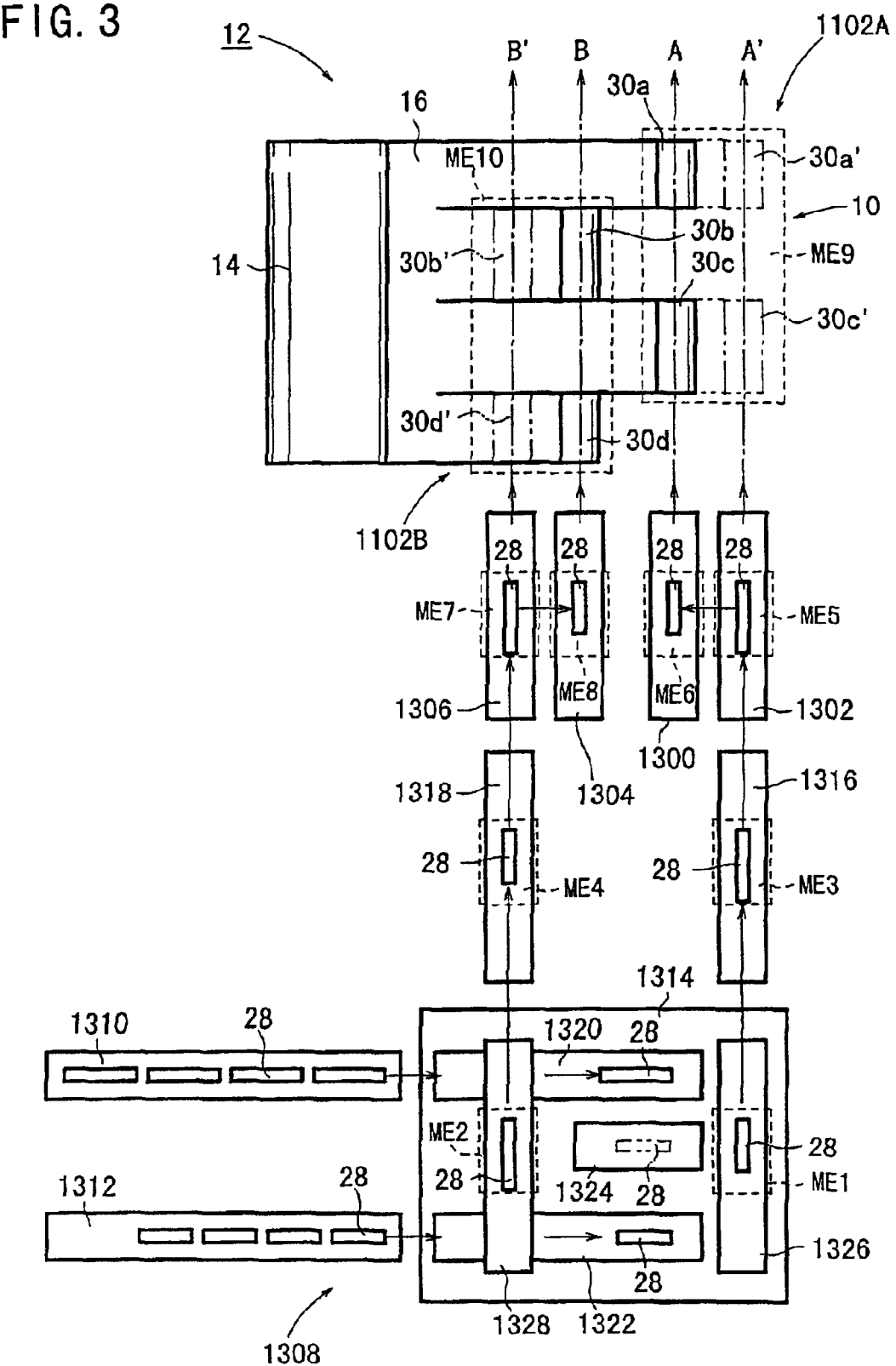
FIG. 3 is a plan view of the film processing and cutting machine shown in FIG. 2 and a core supply apparatus for supplying cores to the film processing and cutting machine.

FIG. 3 illustrates in plan the film processing and cutting machine 12 shown in FIG. 2 and the core supply apparatus 1308 for supplying cores 28 to the film processing and cutting machine 12.

The core supply apparatus 1308 comprises two feed mechanisms 1310, 1312 for supplying a plurality of cores 28 that have been cut to given lengths depending on the widths of the rolls 30a through 30d and the rolls 30a' through 30d' which are manufactured by the film processing and cutting machine 12, and a core loader 1314 for sorting out cores 28 according to length and diameter. The core loader 1314 and the feed mechanisms 1302, 1306 disposed close to the film processing and cutting machine 12 are connected to each other by feed mechanisms 1316, 1318.

The core loader 1314 has a feed mechanism 1320 connected to the feed mechanism 1310 and a feed mechanism 1322 connected to the feed mechanism 1312. A discharger 1324 for discharging cores 28 that have been determined as defective is disposed between the feed mechanisms 1320, 1322. The core loader 1314 also has feed mechanisms 1326, 1328 extending transversely across the feed mechanisms 1320, 1322 and connected to the feed mechanisms 1316, 1318, respectively. Above the discharger 1324, there is disposed a core feed robot (not shown) for loading cores 28 fed to the feed mechanisms 1320, 1322 into the feed mechanisms 1326, 1328 or the discharger (discharging means) 1324. The core loader 1314 has a measuring means, to be described later on, for measuring the length and diameter of each of supplied cores 28.

Figure 4:
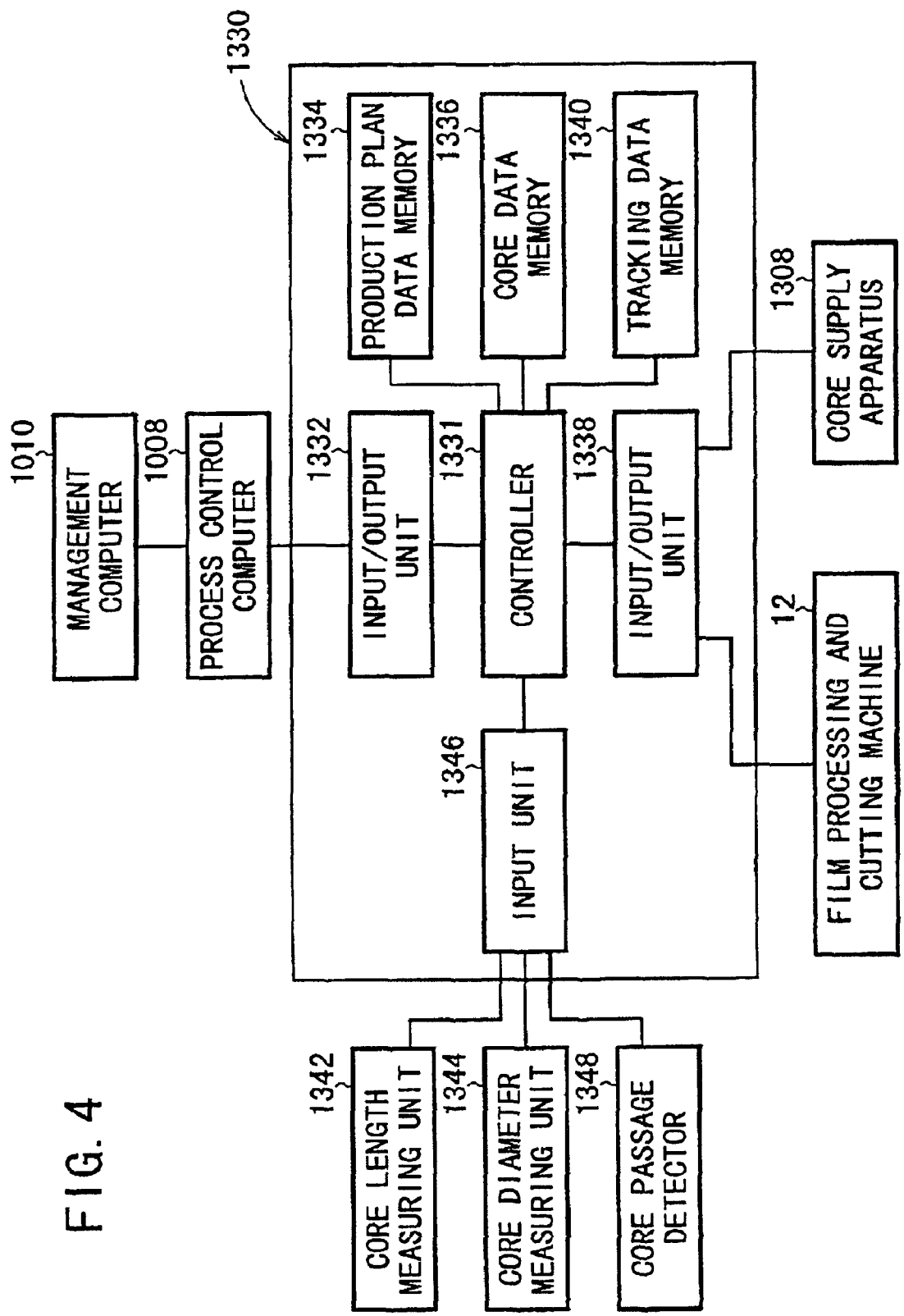
FIG. 4 is a block diagram of a control circuit of the film processing and cutting machine and the core supply apparatus shown in FIG. 3.

FIG. 4 shows in block form a control circuit (comparing means) 1330, according to the first embodiment, of the film processing and cutting machine 12 and the core supply apparatus 1308 which are constructed as described above. As shown in FIG. 4, the control circuit 1330 is controlled by a controller 1331, and a management computer 1010 is connected to the control circuit 1330 through a process control computer 1008. The management computer 1010 manages an overall production process of the roll production line 100 including the film processing and cutting machine 12 and the core supply apparatus 1308. The process control computer 1008 is supplied with production plan data from the management computer 1010.

The production plan data are stored via an input/output unit 1332 of the control circuit 1330 into a production plan data memory (required component information holding means) 1334. The production plan data stored in the production plan data memory 1334 include required component information representing widths of rolls 30a through 30d, 30a' through 30d' produced by the film processing and cutting machine 12 and diameters of cores 28, and data representing winding directions of rolls 30a through 30d, 30a' through 30d'.

The control circuit 1330 has a core data memory (supplied component information holding means) 1336 for storing core data supplied from the core supply apparatus 1308. Core data as supplied component information include data representing diameters and lengths of cores 28 that are cut to given lengths and supplied by the core supply apparatus 1308, and are supplied from the core supply apparatus 1308 via an input/output unit 1338.

Figure 5:
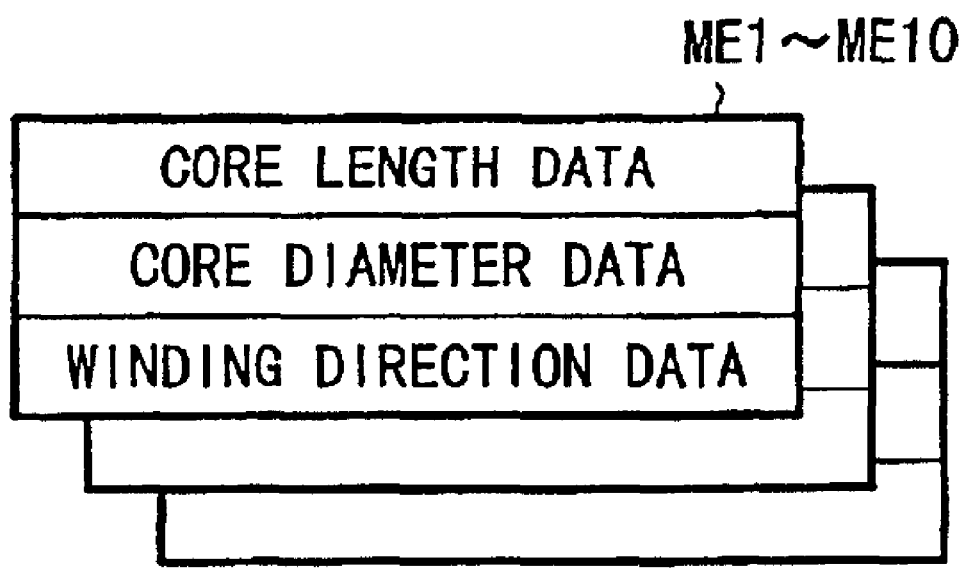
FIG. 5 is a diagram illustrative of tracking data stored in a tracking data memory of the control circuit shown in FIG. 4.

The control circuit 1330 has a tracking data memory (tracking data holding means) 1340 for storing tracking data of cores 28 which are fed from the core loader 1314 of the core supply apparatus 1308 to the film winding apparatus 10 of the film processing and cutting machine 12. As shown in FIG. 5, the tracking data include length and diameter data of cores 28 that have been fed and winding direction data of rolls 30a through 30d, 30a' through 30d' that have been supplied. The tracking data are stored in memory areas ME1 through ME10 which are established in association with the feed mechanisms 1326, 1328, 1316, 1318, 1302, 1300, 1306, 1304, the first winding unit 1102A, and the second winding unit 1102B to which cores 28 are supplied.

The core loader 1314 has a core length measuring unit (component measuring means) 1342 for measuring lengths of cores 28 supplied to the feed mechanisms 1320, 1322 and a core diameter measuring unit (component measuring means) 1344 for measuring diameters of those cores 28. Measured component information obtained by these measuring units is supplied via an input/output unit 1346 to the controller 1331. A plurality of core passage detectors 1348 for detecting passage of cores 28 and copying tracking data stored in the tracking data memory 1340 are disposed in a feed path extending from the core loader 1314 to the film winding apparatus 10. Core detecting signals from the core passage detectors 1348 are supplied via the input/output unit 1346 to the controller 1331.

The roll production line 100 according to the first embodiment to which the method and apparatus according to the present invention are applied is basically constructed as described above. Operation of the roll production line 100 will be described below.

Prior to a process of cutting the film roll 14 with the film processing and cutting machine 12, the management computer 1010 supplies production plan data relative to a type of rolls 30a through 30d, 30a' through 30d' via the process control computer 1008 to the control circuit 1330. The control circuit 1330 stores the supplied production plan data into the production plan data memory 1334, and controls the film winding apparatus 10 of the film processing and cutting machine 12 via the input/output unit 1338 according to the production plan data. For example, according to the production plan data representing the width of rolls 30a through 30d, 30a' through 30d', the diameter of cores 28, and the winding direction of the elongate film 16, the control circuit 1330 adjusts the location of the cutting means (not shown) and determines which of the first winding unit 1102A and the second winding unit 1102B is to manufacture rolls 30a' through 30d'.

Figure 6:
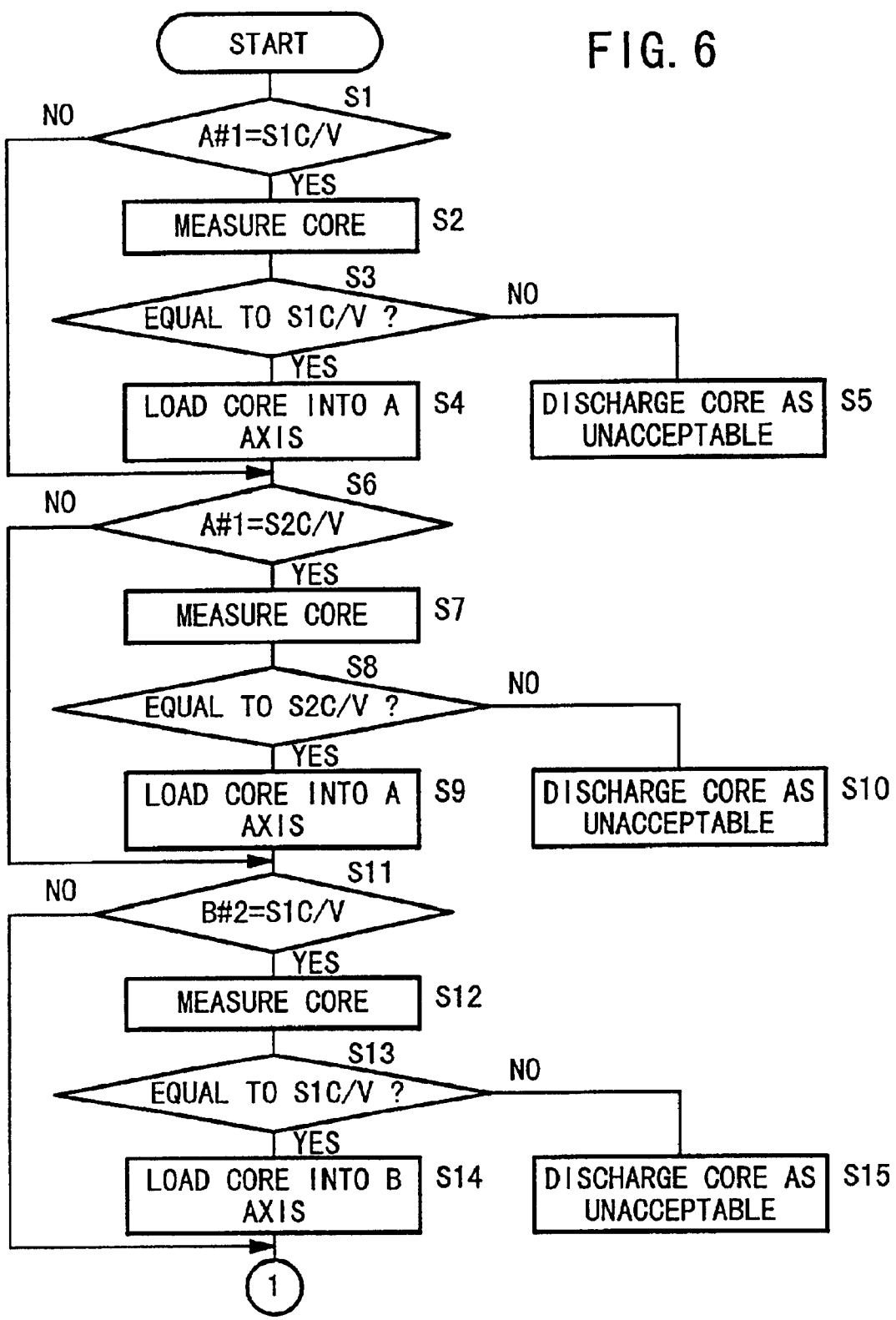
FIGS. 6 through 8 show a flowchart of an operation sequence of a core supply process.
Figure 7:
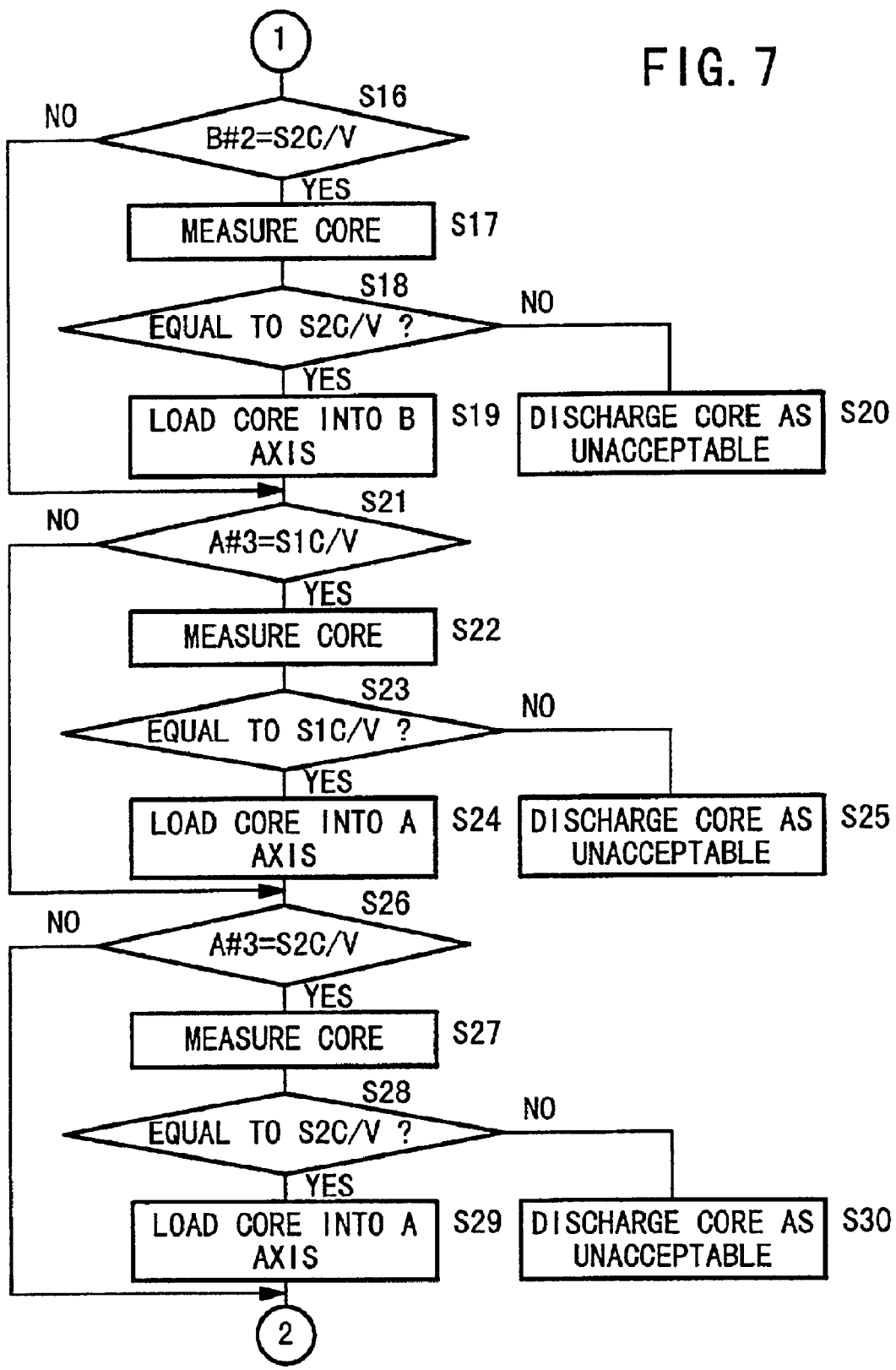
Figure 8:
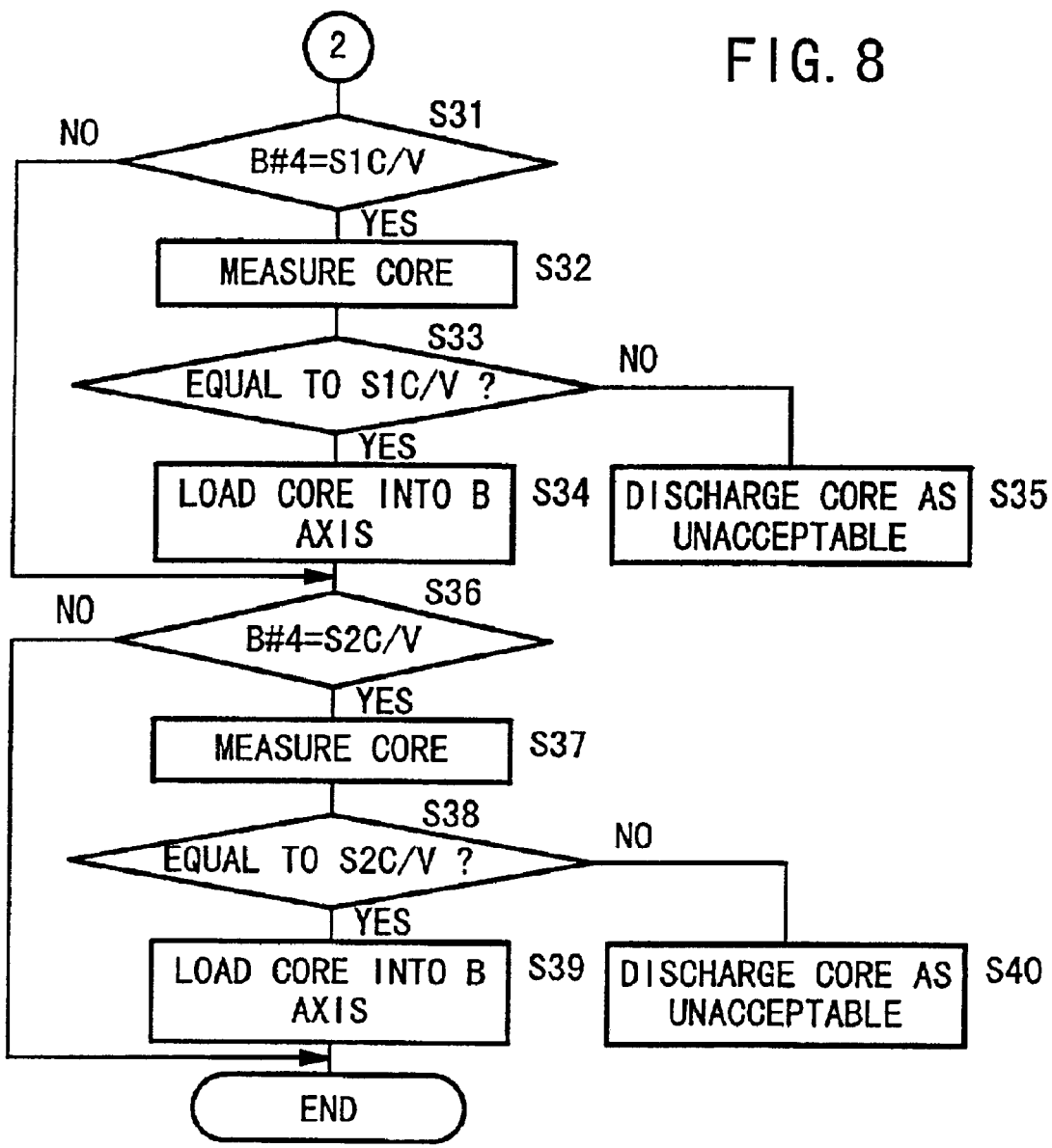

After the film winding apparatus 10 has been adjusted as described above, the control circuit 1330 instructs the core supply apparatus 1308 to supply cores 28 to be used according to the production plan data. A process of supplying cores 28 will be described below with reference to a flowchart shown in FIGS. 6 through 8.

In the flowchart, A#1 and A#3 represent core length data and core diameter data of cores 28 required for rolls 30a through 30d, 30a' through 30d' to be manufactured by the first winding unit 1102A of the film winding apparatus 10 shown in FIG. 3, B#2 and B#4 represent core length data and core diameter data of cores 28 required for rolls 30a through 30d, 30a' through 30d' to be manufactured by the second winding unit 1102B of the film winding apparatus 10, and S1C/V and S2C/V represent core length data and core diameter data of cores 28 supplied to the feed mechanisms 1320, 1322 of the core supply apparatus 1308 shown in FIG. 3.

The controller 1331 reads the data A#1 of a core 28 required to manufacture rolls 30a, 30a' in the first winding unit 1102A from the production plan data memory 1334, reads the data S1C/V of a core 28 fed to the feed mechanism 1320 of the core loader 1314 in the core supply apparatus 1308 from the core data memory 1336, and compares these data A#1, S1C/V with each other in step S1.

If A#1=S1C/V, indicating that a core 28 is fed to the feed mechanism 1320 of the core loader 1314, then the length and diameter of the core 28 supplied to the feed mechanism 1320 are measured in step S2. The length of a core 28 is measured by the core length measuring unit 1342 in the feed mechanism 1320, and supplied to the controller 1331 via the input unit 1346. The diameter of a core 28 is measured by the core diameter measuring unit 1344 in the core feed robot (not shown) for feeding the core 28 when the core 28 is gripped by the core feed robot, and supplied to the controller 1331 via the input unit 1346.

If the measured results agree with the data S1C/V relative to the core 28 in step S3, then the core feed robot loads the core 28 supplied to the feed mechanism 1320 into the feed mechanism 1326 corresponding to the A axis (associated with the first winding unit 1102A) of the film winding apparatus 10 in step S4. When the core 28 is loaded into the feed mechanism 1326, control goes to a process of supplying cores 28 to rolls 30b, 30b'.

If the measured results do not agree with the data S1C/V relative to the desired core 28 in step S3, then the controller 1331 determines that the data suffer some defect or the core supply apparatus 1308 fails to supply the core 28. The core feed robot loads the core 28 supplied to the feed mechanism 1320 into the discharger 1324 in step S5. When the core 28 is loaded into the discharger 1324, a process for a next core 28 may be repeated, or the core supply apparatus 1308 may be shut off, allowing the operator to confirm the situation.

When the suitable core 28 is loaded into the feed mechanism 1326 in step S4, the controller 1331 generates tracking data which comprise the core length data and core diameter data of the core 28 and the winding direction data, from the production plan data memory 1334, of a roll 30a or 30a' to which the core 28 is supplied, and stores the generated tracking data in the memory area ME1 of the tracking data memory 1340 corresponding to the feed mechanism 1326.

If A#1≠S1C/V in step S1, then the controller 1331 reads the data S2C/V of a core 28 fed to the feed mechanism 1322 of the core loader 1314 in the core supply apparatus 1308 from the core data memory 1336, and compares the data S2C/V with the data A#1 in step S6. Thereafter, as with steps S2 through S5, the core 28 supplied to the feed mechanism 1322 is loaded into the feed mechanism 1326 associated with the A axis of the film winding apparatus 10 or loaded as an inappropriate core 28 into the discharger 1324 in steps S7 through S10.

Then, the controller 1331 reads the data B#2 of a core 28 required to manufacture rolls 30b, 30b' in the second winding unit 1102B from the production plan data memory 1334, reads the data S1C/V of a core 28 fed to the feed mechanism 1320 of the core loader 1314 in the core supply apparatus 1308 from the core data memory 1336, and compares these data B#2, S1C/V with each other in step S11. Thereafter, as with steps S2 through S5, the core 28 supplied to the feed mechanism 1320 is loaded into the feed mechanism 1328 associated with the B axis of the film winding apparatus 10 or loaded as an inappropriate core 28 into the discharger 1324 in steps S12 through S15.

The memory area ME2 of the tracking data memory 1340 corresponding to the feed mechanism 1328 stores the core length data and core diameter data of the core 28 supplied to a roll 30b or 30b', and the winding direction data of the roll 30b or 30b'.

If B#2≠S1C/V in step S11, then the controller 1331 reads the data S2C/V of a core 28 fed to the feed mechanism 1322 of the core loader 1314 in the core supply apparatus 1308 from the core data memory 1336, and compares the data S2C/V with the data B#2 in step S16. Thereafter, as with steps S12 through S15, the core 28 supplied to the feed mechanism 1322 is loaded into the feed mechanism 1328 associated with the B axis of the film winding apparatus 10 or loaded as an inappropriate core 28 into the discharger 1324 in steps S17 through S20.

When the core 28 corresponding to the roll 30a or 30a' is supplied to the feed mechanism 1326, the core 28 corresponding to the roll 30b or 30b' is supplied to the feed mechanism 1328, and these cores 28 are fed to the next feed mechanisms 1316, 1318, cores 28 are supplied to the roll 30c or 30c' and the roll 30d or 30d' in steps S21 through S40.

The cores 28 supplied from the core supply apparatus 1308 are fed together with tracking data added thereto to the film processing and cutting mechanism 12. Specifically, when the core passage detector 1348 detects the cores 28 fed from the feed mechanisms 1326, 1328 of the core loader 1314 to the feed mechanisms 1316, 1318, the controller 1331 copies the tracking data stored in the memory areas ME1, ME2 to the memory areas ME3, ME4 corresponding to the feed mechanisms 1316, 1318.

Similarly, as the cores 28 are fed from the feed mechanisms 1316, 1318 to the feed mechanisms 1302, 1306, the feed mechanisms 1300, 1304, the first winding unit 1102A, and the second winding unit 1102B, the tracking data are also copied from the memory areas ME3, ME4 successively to the memory areas ME5, ME7, the memory areas ME6, ME8, and the memory areas ME9, ME10.

By thus moving the tracking data together with the cores 28, it is possible to transfer the information of the cores 28 with the tracking data, thus preventing inappropriate cores 28 from being supplied to the film processing and cutting machine 12 in advance.

To the tracking data, there are added data of the winding directions of supplied rolls 30a through 30d, 30a' through 30d' to be able to determine which of the A and B axes or the A' and B' axes the cores 28 in the feed mechanisms 1302, 1306 are to be fed to.

A roll production line 100 according to a second embodiment of the present invention to which the method and apparatus according to the present invention are applied will be described below. Those parts of the second embodiment which are identical to those of the first embodiment are denoted by identical reference characters, and will not be described in detail below.

Figure 9:
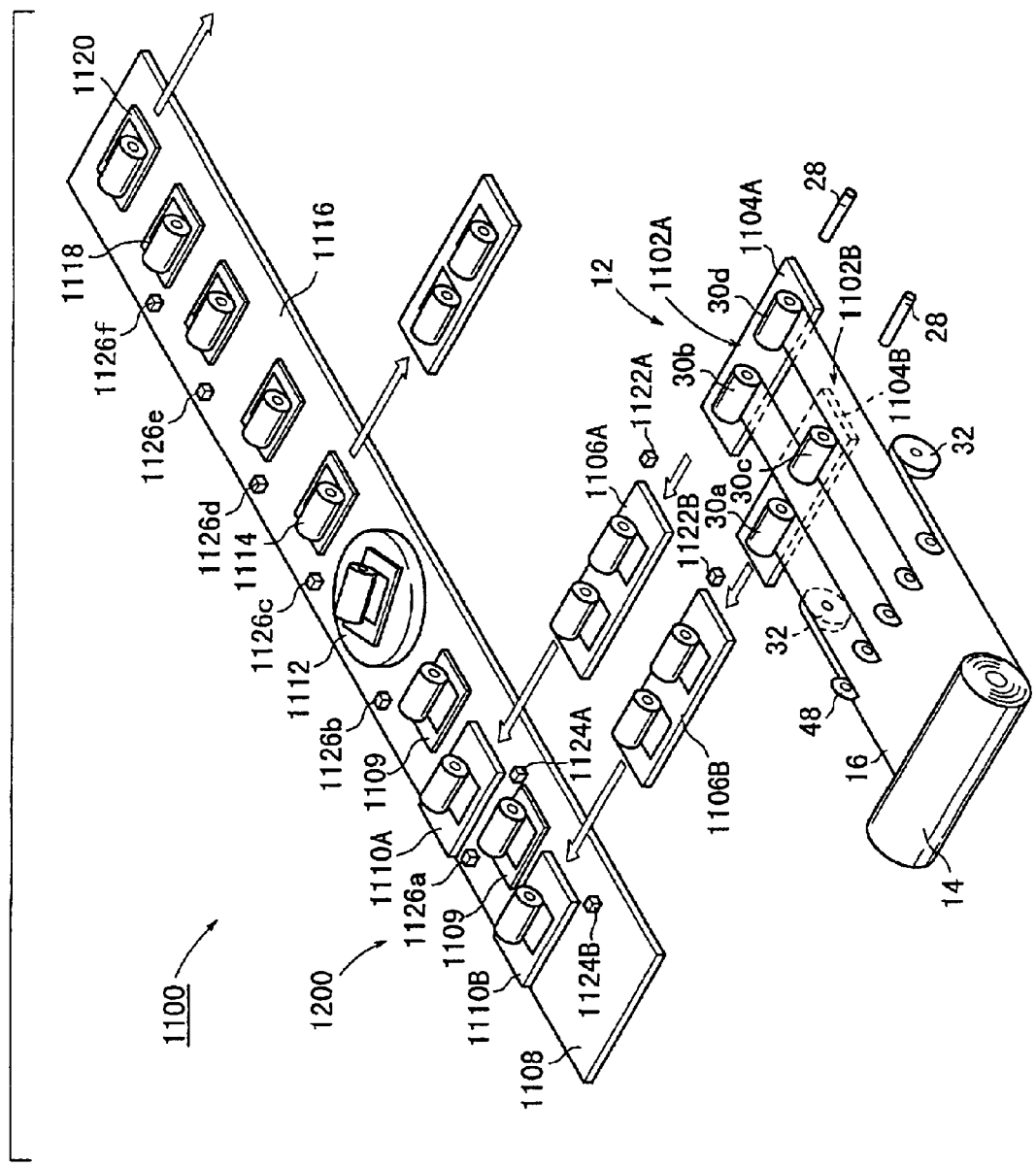
FIG. 9 is a perspective view of the film processing and cutting machine and a roll feed mechanism which serve as part of the roll production line shown in FIG. 1.

FIG. 9 schematically shows in perspective a film processing and feeding apparatus 100 according to the second embodiment. In the second embodiment shown in FIG. 9, the rolls 30b, 30d are wound in the first winding unit 1102A and the rolls 30a, 30c are wound in the second winding unit 1102B in the film processing and cutting machine 12.

The first winding unit 1102A and the second winding unit 1102B have a first feed unit 1104A and a second feed unit 1104B for feeding the wound rolls 30a through 30d to the roll feed mechanism 1200.

The roll feed mechanism 1200 comprises a first feed unit 1106A and a second feed unit 1106B (feed means) for receiving rolls 30a through 30d from the first feed unit 1104A and the second feed unit 1104B and feeding the received rolls 30a through 30d, and a main feed unit 1108 for arranging the rolls 30a through 30d received from the first feed unit 1106A and the second feed unit 1106B into an array and feeding the arrayed rolls 30a through 30d to a next process.

Over the main feed unit 1108 connected to the first feed unit 1106A and the second feed unit 1106B, there are disposed a first transfer unit 1110A and a second transfer unit 1110B (transfer means) for transferring the rolls 30a through 30d onto pallets 1109 on the main feed unit 1108. On the main feed unit 1108, there are disposed, successively from the first transfer unit 1110A and the second transfer unit 1110B, a turntable 1112 for changing the direction of the rolls 30a through 30d, a roll discharger 1114 for discharging specified ones of the rolls 30a through 30d, buffers 1116, 1118 for adjusting the speed at which the rolls 30a through 30d are fed, and a roll transfer unit 1120 for transferring the rolls 30a through 30d to a next process.

Roll passage detectors 1122A, 1122B and 1124A, 1124B for detecting passage of rolls 30a through 30d are disposed in front of and behind the first feed unit 1106A and the second feed unit 1106B. Similarly, roll passage detectors 1126a through 1126f for detecting passage of rolls 30a through 30d are disposed between the second transfer unit 1110B, the first transfer unit 1110A, the turntable 1112, the roll discharger 1114, the buffers 1116, 1118, and the roll transfer unit 1120.

Figure 10:
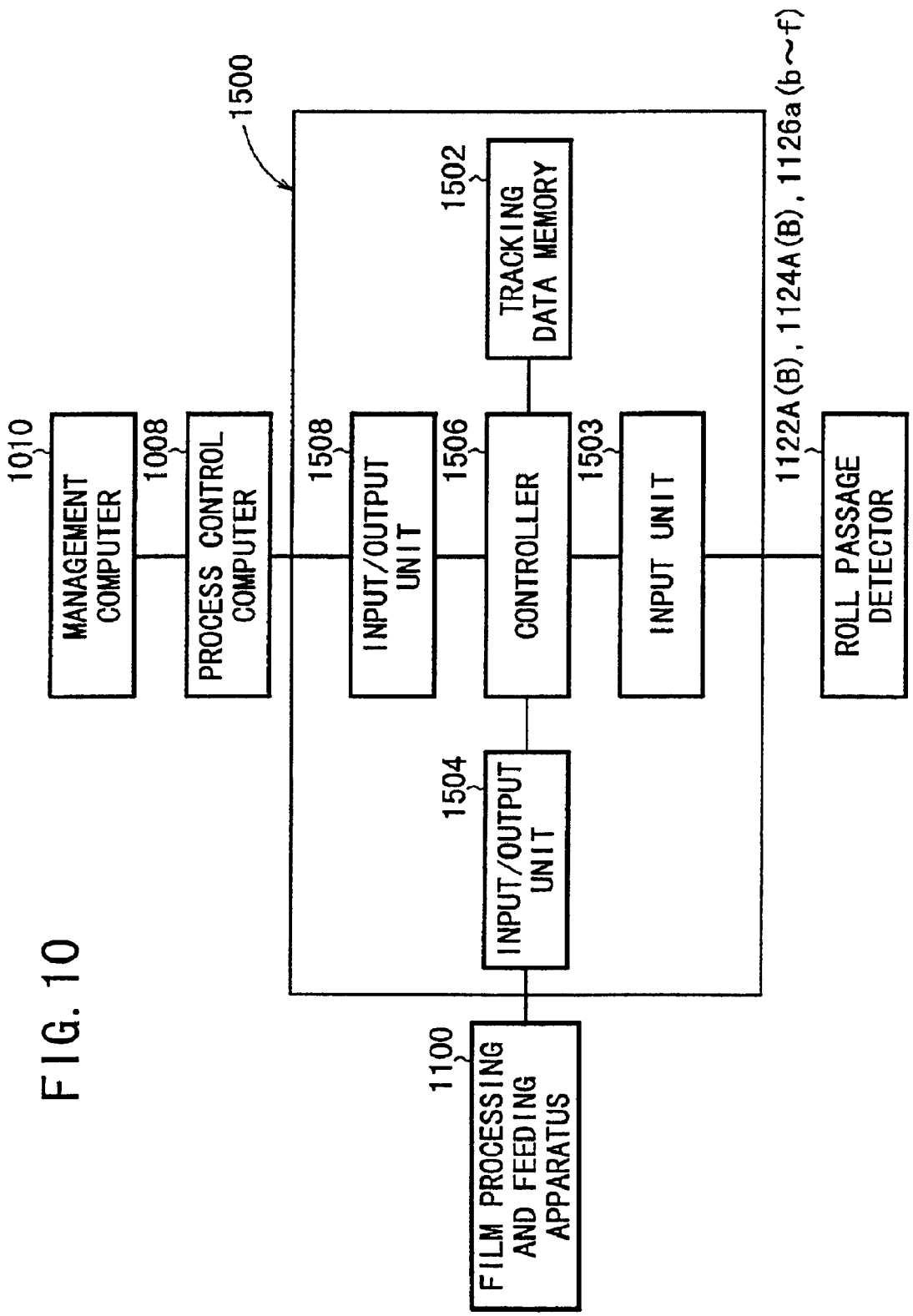
FIG. 10 is a block diagram of a control circuit of the film processing and feeding apparatus shown in FIG. 9.

FIG. 10 shows in block form a control circuit 1500 of the film processing and feeding apparatus 1100. The control circuit 1500 has a tracking data memory (address information holding means, preceding address information holding means) 1502 for storing tracking data for managing address information of rolls 30a through 30d fed by the film processing and feeding apparatus 1100, and a controller (product selecting means) 1506 for receiving, via an input unit 1503, passage information of rolls 30a through 30d detected by the roll passage detectors 1122A, 1122B and 1124A, 1124B, 1126a through 1126f, and controlling the film processing and feeding apparatus 1100 via an input/output unit 1504 according to the passage information and the tracking data.

The process control computer 1008 to which the management computer 1010 is connected is connected to the control circuit 1500 through an input/output unit 1508. Based on a production plan, the management computer 1010 supplies the control circuit 1500 with cutting information for rolls 30a through 30d.

Figure 11:
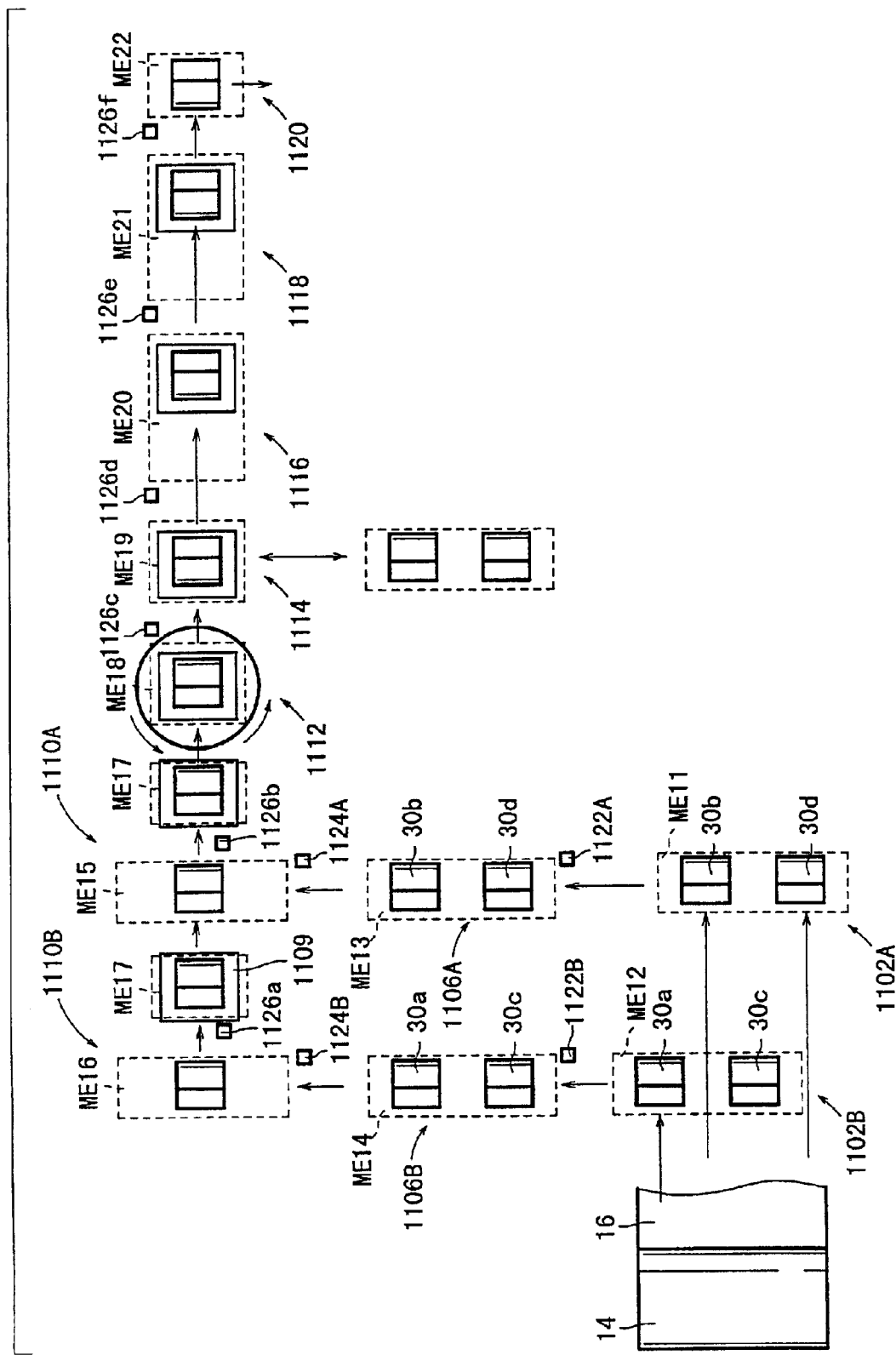
FIG. 11 is a view showing memory areas corresponding to various regions of the film processing and feeding apparatus shown in FIG. 9.

FIG. 11 shows the relationship between memory areas ME11 through ME22 of the tracking data memory 1502 for storing tracking data and various regions corresponding to the memory areas ME11 through ME22. The memory areas ME11, ME12 hold address information of rolls 30a through 30d in the first winding unit 1102A and the second winding unit 1102B. The memory areas ME13, ME14 hold address information of rolls 30a through 30d in the first feed unit 1106A and the second feed unit 1106B. The memory areas ME15, ME16 hold address information of rolls 30a through 30d in the first transfer unit 1110A and the second transfer unit 1110B. The memory areas ME17 through ME22 hold address information of rolls 30a through 30d in loading positions for the rolls 30a through 30d in the main feed unit 1108.

Figure 12:
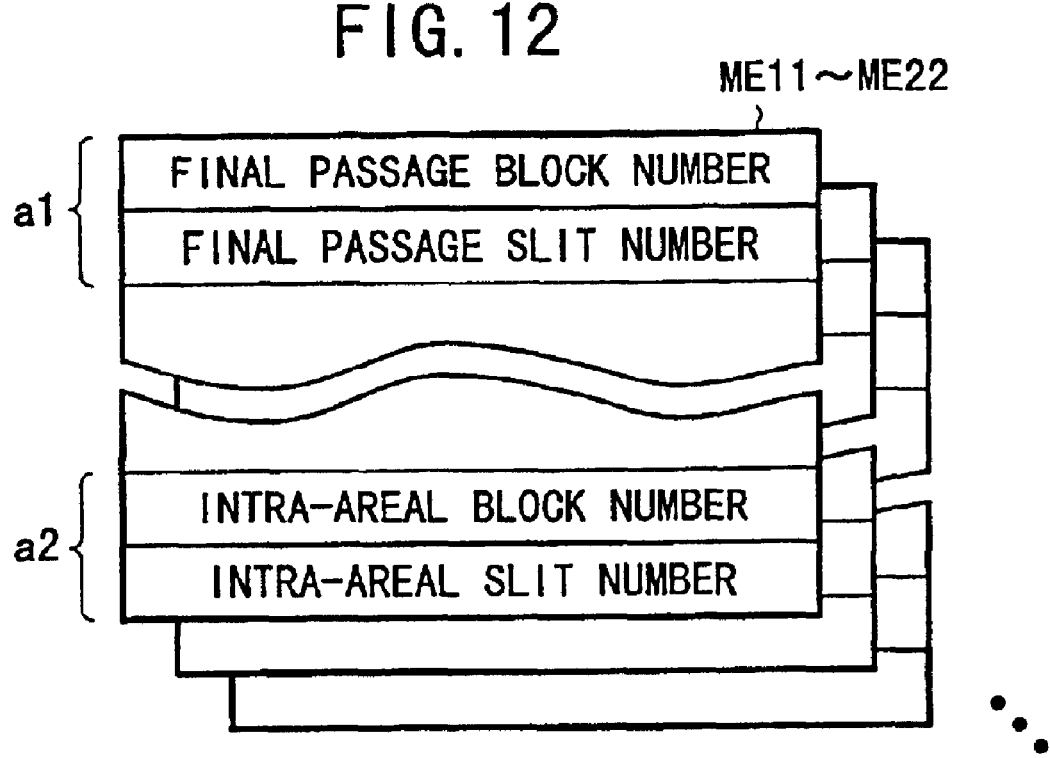
FIG. 12 is a diagram illustrative of tracking data stored in a tracking data memory of the control circuit shown in FIG. 10.

FIG. 12 shows an arrangement of tracking data stored in each of the memory areas ME11 through ME22 of the tracking data memory 1502. The tracking data have a header a1 and slit data a2. The header a1 includes block numbers (final passage block numbers) and slit numbers (final passage slit numbers) which represent final address information of rolls 30a through 30d that have passed respective regions of the film processing and feeding apparatus 1100 which correspond to the memory areas ME11 through ME22. The slit data a2 include block numbers (intra-areal block numbers) and slit numbers (intra-areal slit numbers) which represent address information of rolls 30a through 30d that are presently positioned in the regions of the film processing and feeding apparatus 1100 which correspond to the memory areas ME11 through ME22.

Figure 13:
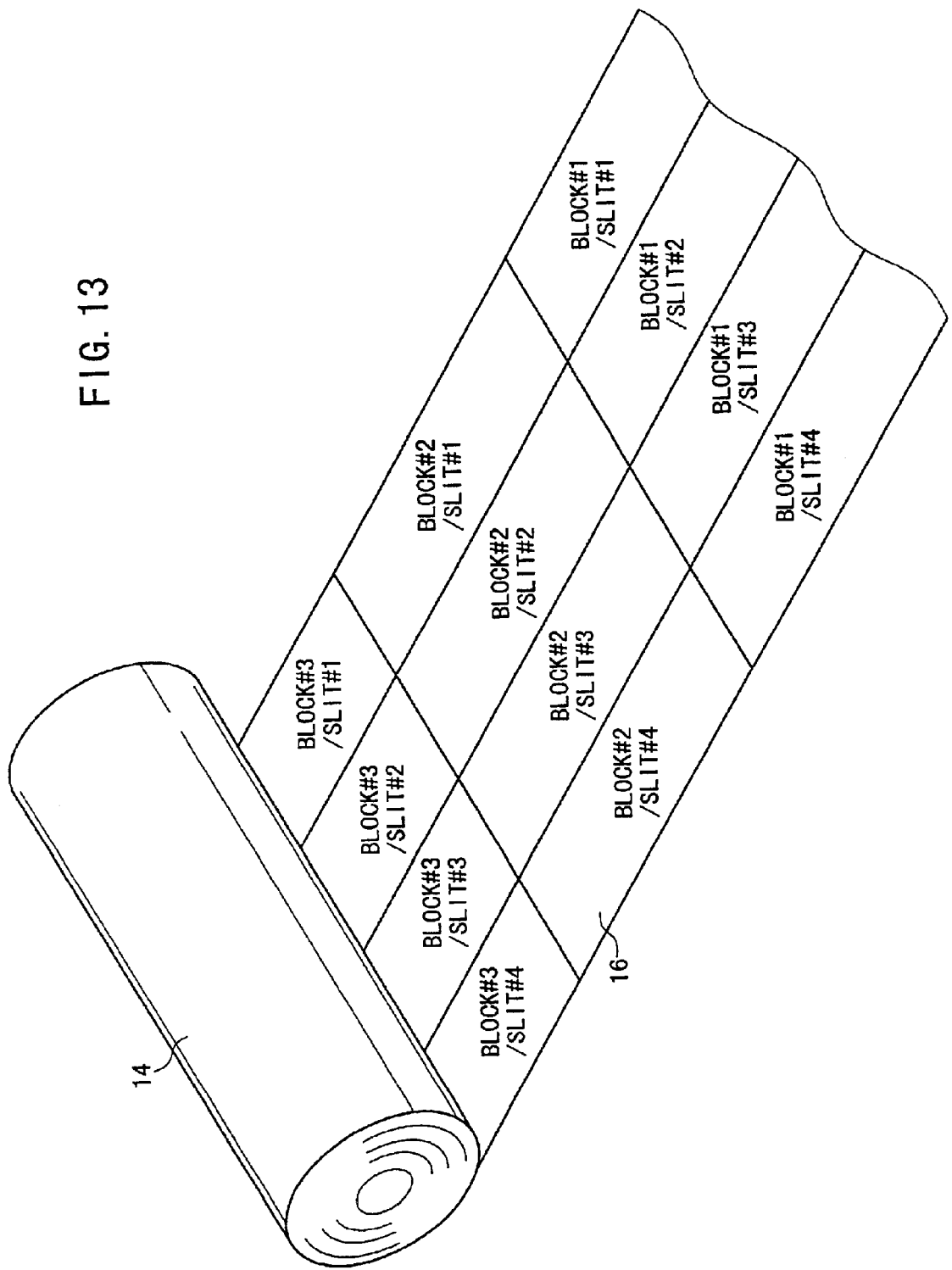
FIG. 13 is a perspective view illustrative of block numbers and slit numbers which are tracking data set on a web.

The block numbers and the slit numbers are defined as shown in FIG. 13. The block numbers are numbers representing rolls 30a through 30d that are produced by cutting the film roll 14 in a direction perpendicular to the longitudinal direction of the film roll 14. The slit numbers are numbers representing rolls 30a through 30d that are produced by cutting the film roll 14 in the longitudinal direction thereof with the rotary cutters 48. In the second embodiment, the block numbers are successively set as block #1, block #2, . . . in the longitudinal direction of the elongate film 16 as it is drawn from the film roll 14. The slit numbers are successively set as slit #1, slit #2, . . . in the transverse direction of the elongate film 16 from the side where rolls 30a through 30d are delivered.

The film processing and feeding apparatus 1100 according to the second embodiment and the control circuit 1500 thereof are basically constructed as described above. Operation of the film processing and feeding apparatus 1100 and the control circuit 1500 will be described below.

Prior to a process of cutting the film roll 14 with the film processing and cutting machine 12, the management computer 1010 supplies production information relative to a type of rolls 30a through 30d based on a production plan via the process control computer 1008 to the control circuit 1500. The control circuit 1500 controls the film processing and cutting machine 12 of the film processing and feeding apparatus 1100 via the input/output unit 1504 according to the supplied production information. For example, according to the production information representing the width of rolls 30a through 30d and the diameter of cores 28, the control circuit 1500 adjusts the location of the rotary cutters 48 and determines which of the first winding unit 1102A and the second winding unit 1102B is to manufacture rolls 30a through 30d.

In the second embodiment, the locations of winding mechanisms 1103a through 1103d, 1103e through 1103h (see FIGS. 14 and 15) of the first winding unit 1102A and the second winding unit 1102B with respect to the direction indicated by the arrows and the location of the rotary cutters 48 are adjusted depending on the different diameters of the cores 28, the different widths of the rolls 30a through 30d, and the different winding directions (indicative of whether a roll with an inner coated surface or a roll with an outer coated surface is to be produced) of the elongate film 16.

Figure 14:
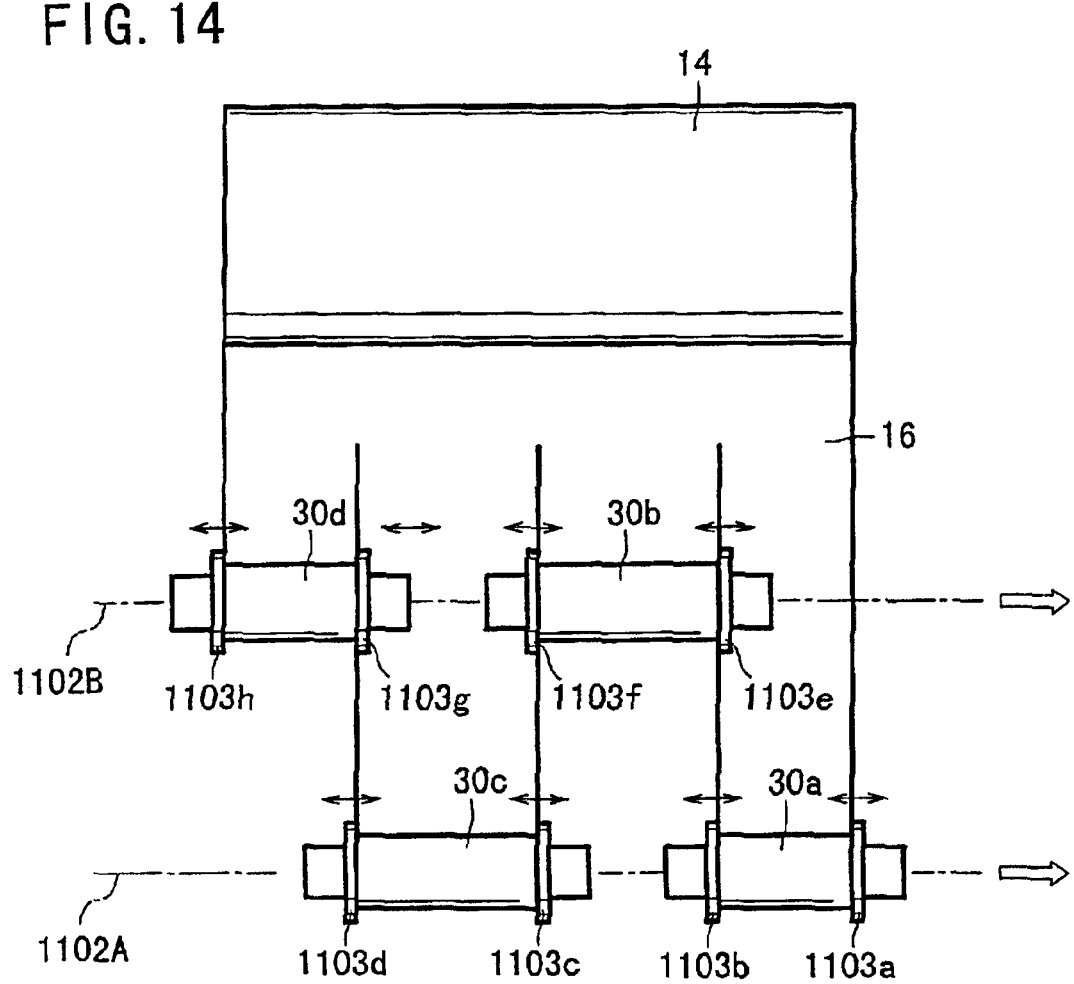
FIG. 14 is a view illustrative of a manufacturing pattern of products in the film processing and cutting machine in a state shown in FIGS. 1 and 2.

In FIG. 14, the distances between the winding mechanisms 1103b, 1103c and between the winding mechanisms 1103f, 1103g cannot be reduced beyond a certain width because of a mechanical interference. Therefore, the width of the roll 30b wound by the winding mechanism 1103e, 1103f of the second winding unit 1102B corresponding to the region between the winding mechanisms 1103b, 1103c is limited to or more than a certain value. Similarly, the width of the roll 30c wound by the winding mechanisms 1103c, 1103d of the first winding unit 1102A corresponding to the region between the winding mechanisms 1103f, 1103g is also limited to or more than a certain value. As a result, the first winding unit 1102A and the second winding unit 1102B have a choice of two patterns where the wide rolls 30b, 30c are positioned at its center, as shown in FIGS. 14 and 15.

Figure 15:
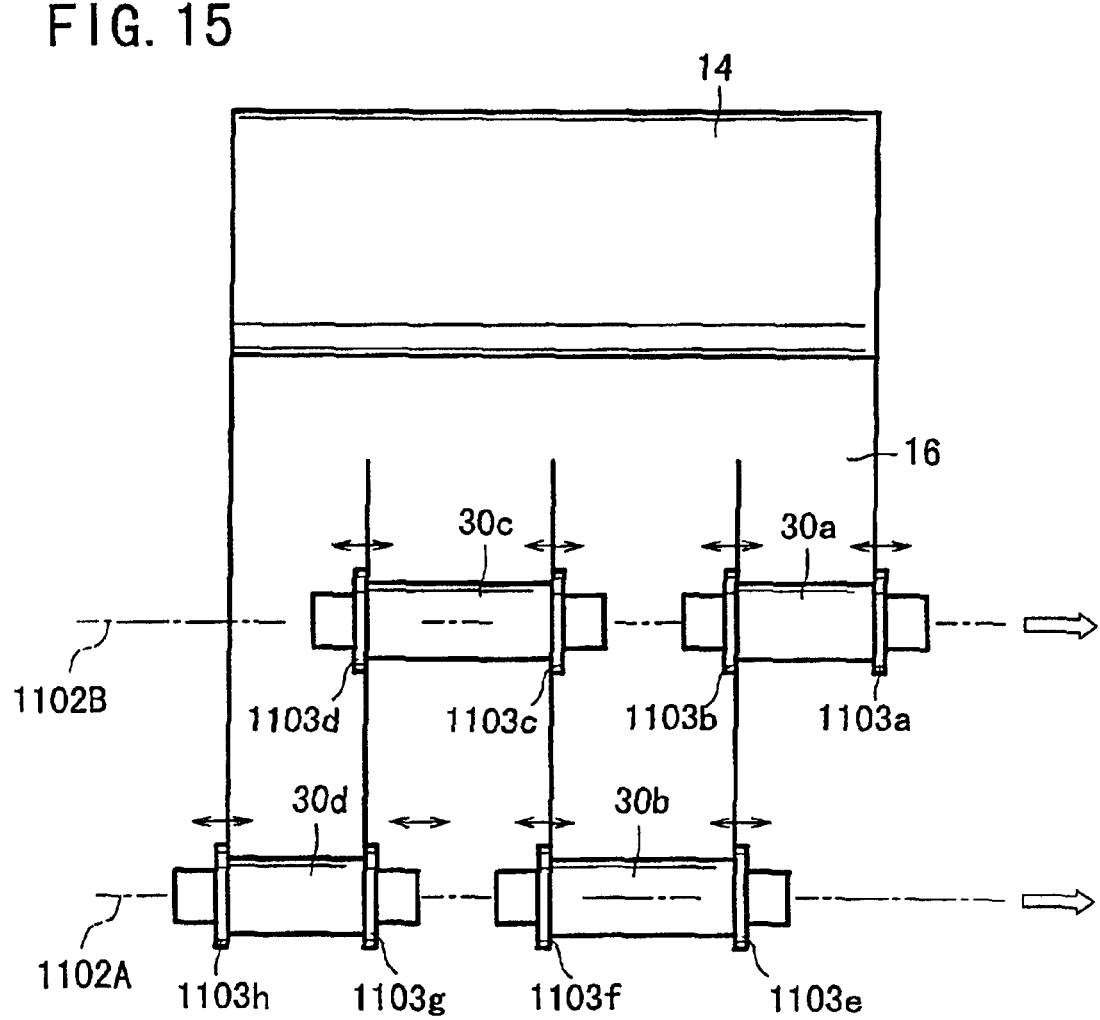
FIG. 15 is a view illustrative of a manufacturing pattern of products in the film processing and cutting machine in a state shown in FIG. 9.

After one of the patterns shown in FIGS. 14 and 15 is thus selected and the film processing apparatus 12 has been adjusted, the rolls 30a through 30d start being manufactured. The elongate film 16 drawn from the film roll 14 is cut by the rotary cutters 48 into films, which are wound around respective cores 28 in the first winding unit 1102A and the second winding unit 1102B, thus producing rolls 30a through 30d.

When the rolls 30a through 30d are produced in the first winding unit 1102A and the second winding unit 1102B, the memory area M111 and the memory area ME12 store block numbers and slit numbers as the slit data a2.

For example, if the rolls 30a through 30d are manufactured according to the pattern shown in FIG. 14, the memory area ME11 stores block #1 as an intra-areal block number and slit #1 and slit #3 as intra-areal slit numbers, and the memory area ME12 stores block #1 as an intra-areal block number and slit #2 and slit #4 as intra-areal slit numbers.

If the rolls 30a through 30d are manufactured according to the pattern shown in FIG. 15, the memory area ME11 stores block #1 as an intra-areal block number and slit #2 and slit #4 as intra-areal slit numbers, and the memory area ME12 stores block #1 as an intra-areal block number and slit #1 and slit #3 as intra-areal slit numbers.

Figure 16:
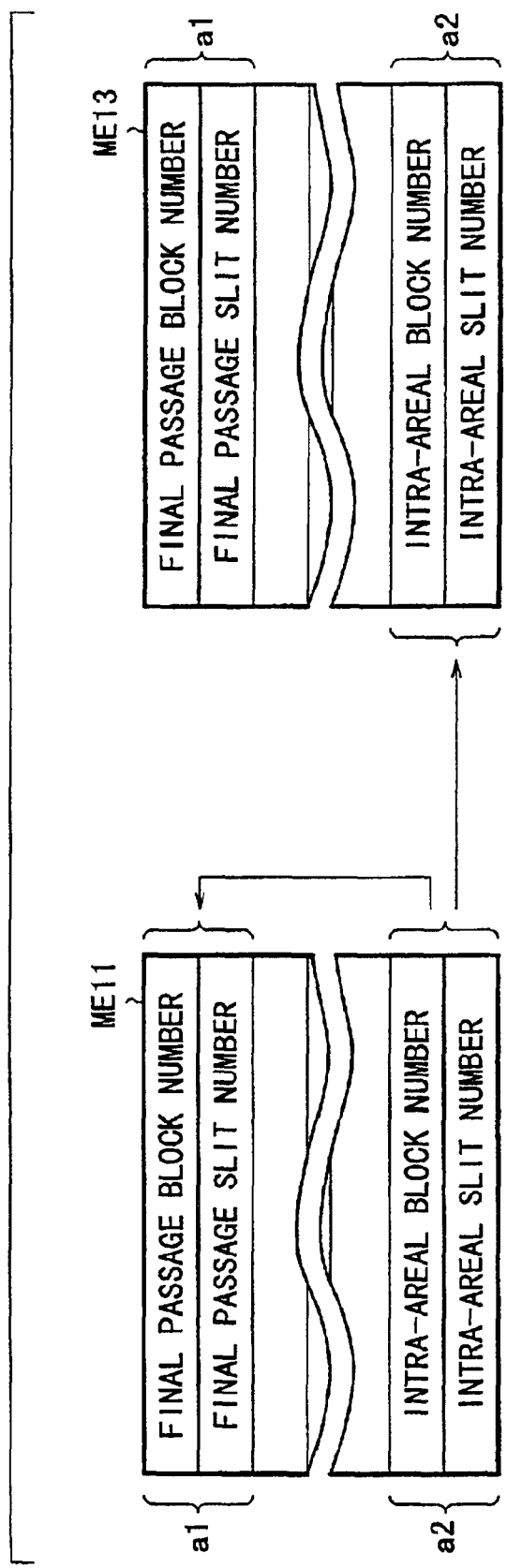
FIG. 16 is a diagram showing the manner in which the tracking data shown in FIG. 12 are rewritten.

For manufacturing the rolls 30a through 30d according to the pattern shown in FIG. 14, when the first feed unit 1104A is actuated to feed a roll 30a of block #1, slit #1 to the first feed unit 1106A, the roll passage detector 1122A detects passage of the roll 30a. Based on a detected signal representing the roll 30a, the controller 1506 stores tracking data of block #1, slit #1 as the slit data a2 in the memory area ME13 corresponding to the first feed unit 1106A. The controller 1506 also stores the tracking data of block #1, slit #1 of the roll 30a which have been stored as the slit data a2 up to present, as a final passage block number and a final passage slit number as the header a1 in the memory area ME11 which corresponds to the first feed unit 1104A to which the roll 30a is fed. FIG. 16 schematically shows such a process of rewriting the tracking data.

Similarly, when a core 30b of block #1, slit #2 is fed from the second feed unit 1104B to the second feed unit 1106B, tracking data of block #1, slit #2 are stored as the slit data a2 in the memory area ME14, and tracking data of block #1, slit #2 are stored as the header a1 in the memory area ME12.

The above process of processing the tracking data with the controller 1506 is also performed as the rolls 30a through 30d are fed from the film processing and cutting mechanism 12 to various portions of the film feed mechanism 1200.

Since the rolls 30a through 30d are fed from the film processing and cutting mechanism 12 in either one of the patterns shown in FIGS. 14 and 15, the first transfer unit 1110A and the second transfer unit 1110B are required to detect the sequence in which the rolls 30a through 30d are fed, and selectively supply the rolls 30a through 30d to the main feed unit 1108.

A process of supplying the rolls 30a through 30d to the main feed unit 1108 in the order of slits will be described below with reference to flowcharts shown in FIGS. 17 and 18.

Figure 17:
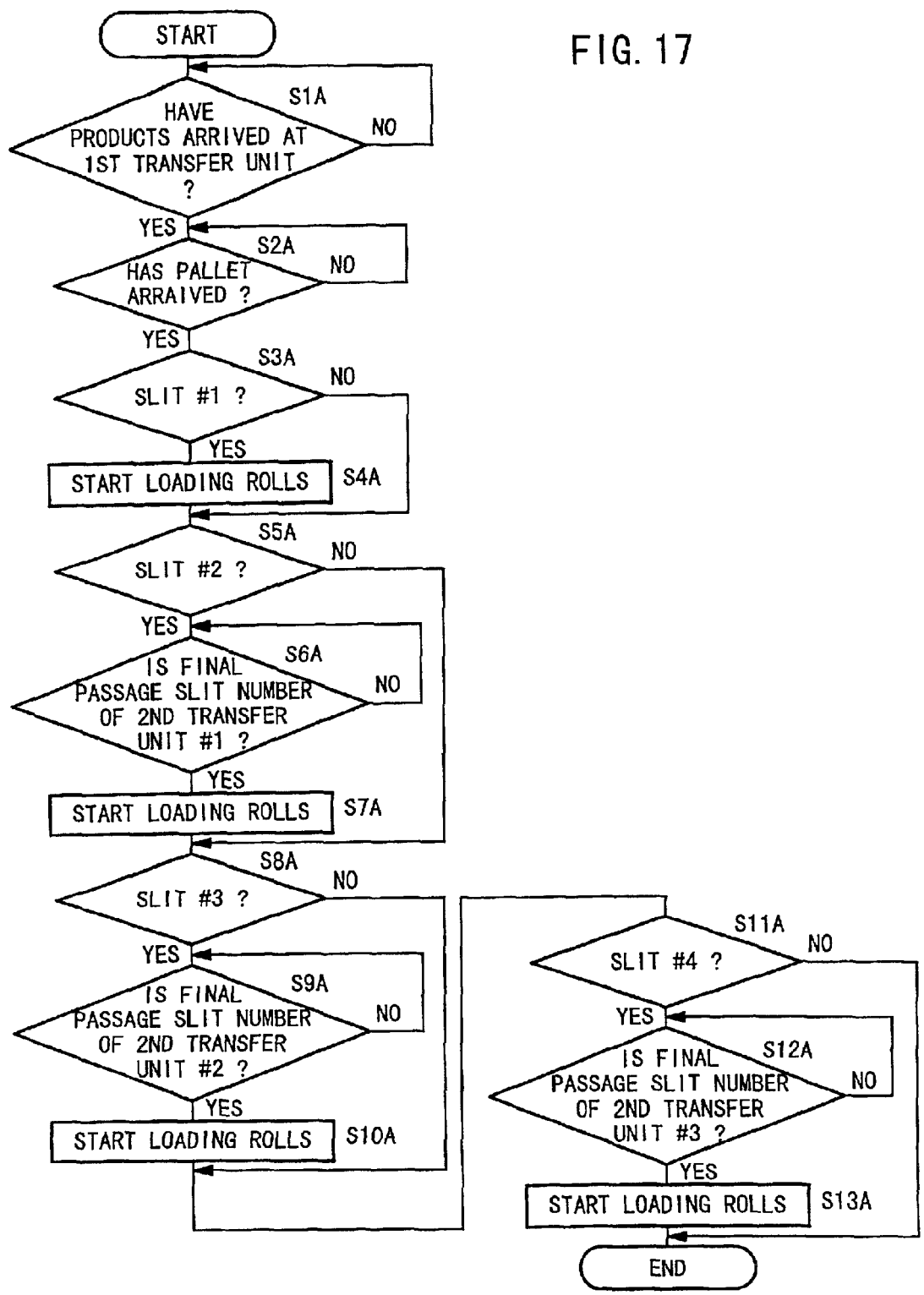
FIG. 17 is a flowchart of a processing sequence of a first transfer unit in the roll feed mechanism shown in FIG. 9.

FIG. 17 shows a process in the first transfer unit 1110A. If the controller 1506 detects that the rolls 30a through 30d are supplied to the main transfer unit 1110A in step S1A and the pallet 1109 arrives at a given area in the main feed unit 1108 in step S2A, then the controller 1506 reads the tracking data stored in the memory area ME15. If the intra-areal slit number of the slit data a2 is slit #1 in step S3A, then the controller 1506 transfers the rolls 30a through 30d in the first transfer unit 1110A to the pallet 1109 in step S4A. In this case, the rolls 30a through 30d are supplied according to the pattern shown in FIG. 14.

Then, the controller 1506 reads again the tracking data stored in the memory area ME15. If the intra-areal slit number of the slit data a2 is slit #3 in step S8A, then the controller 1506 reads the tracking data stored in the memory area ME16 corresponding to the second transfer unit 1110B. If the final passage slit number of the header a1 of the tracking data is slit #2 in step S9A, then since it is determined that the rolls 30a through 30d of slit #2 have already been supplied from the second transfer unit 1110B to the pallet 1109, the controller 1506 transfers the rolls 30*a* through 30*d* of slit #3 to the pallet 1109 in step S10A.

If the intra-areal slit number of the slit data a2 stored in the memory area ME15 corresponding to the first transfer unit 1110A is slit #2 in step S5A, then the controller 1506 reads the tracking data stored in the memory area ME16 corresponding to the second transfer unit 1110B. After the rolls 30*a* through 30*d* whose final passage slit number of the header a1 is slit #1 are detected as being supplied to the main feed unit 1108 in step S6A, the controller 1506 transfers the rolls 30*a* through 30*d* of slit #2 to the pallet 1109 in step S7A. In this case, the rolls 30*a* through 30*d* are supplied according to the pattern shown in FIG. 15.

Then, the controller 1506 reads again the tracking data stored in the memory area ME15. If the intra-areal slit number of the slit data a2 is slit #4 in step S11A, then the controller 1506 reads the tracking data stored in the memory area ME16 corresponding to the second transfer unit 1110B. If the final passage slit number of the header a1 of the tracking data is slit #3 in step S12A, then since it is determined that the rolls 30*a* through 30*d* of slit #3 have already been supplied from the second transfer unit 1110B to the pallet 1109, the controller 1506 transfers the rolls 30*a* through 30*d* of slit #4 to the pallet 1109 in step S13A.

Figure 18:
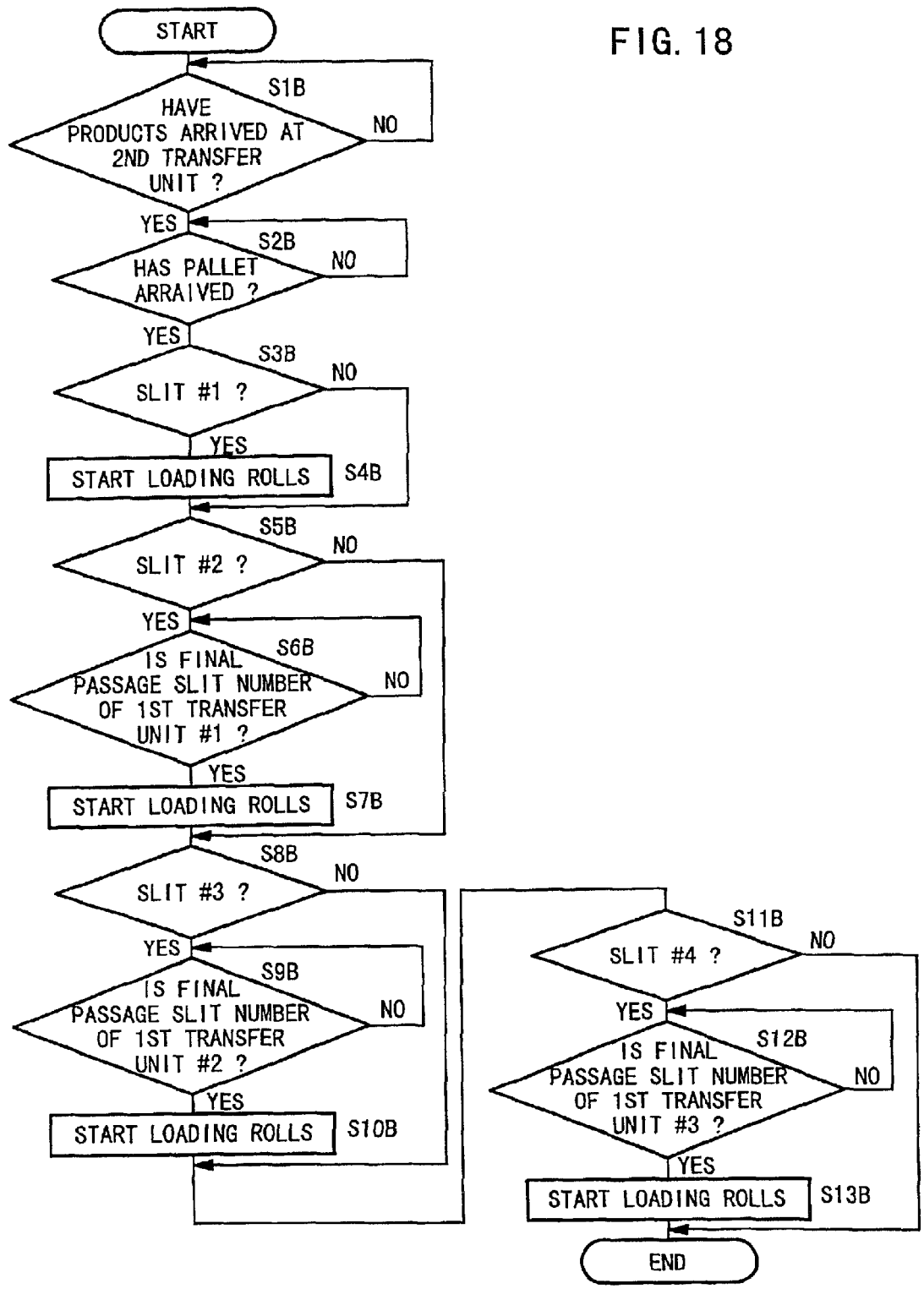
FIG. 18 is a flowchart of a processing sequence of a second transfer unit in the roll feed mechanism shown in FIG. 9.

FIG. 18 shows a process in the second transfer unit 1110B. The second transfer unit 1110B performs the same process as the first transfer unit 1110A in steps S1B through S13B which correspond to steps S1A through S13A.

The main feed unit 1108 is thus supplied with the rolls 30*a* through 30*d* in the order of slits #1 through #4 which are manufactured from the film roll 14. Similarly, the main feed unit 1108 is supplied with the rolls 30*a* through 30*d* in the order of slits which have a next block number.

The rolls 30*a* through 30*d* transferred to the main feed unit 1108 are changed in orientation when necessary by the turntable 1112, and thereafter reach the roll discharger 1114. Inasmuch as the rolls 30*a* through 30*d* are supplied in a desired sequence to the roll discharger 1114, the operator can reliably discharge the rolls 30*a* through 30*d* as desired without errors. The rolls 30*a* through 30*d* are then delivered through the buffers 1116, 1118 and the roll transfer unit 1120 to a next process.

As described above, rolls 30*a* through 30*d* supplied via the first transfer unit 1110A and the second transfer unit 1110B are rearranged in the order of slits and supplied to the main feed unit 1108. In the second embodiment described above, the rolls 30*a* through 30*d* supplied via the first feed unit 1104A and the second feed unit 1104B are selected by the first transfer unit 1110A and the second transfer unit 1110B and supplied to the main feed unit 1108. However, rolls 30*a* through 30*d* from three or more feed units may be supplied in a desired sequence to the main feed unit 1108 and arranged therein.

Although certain preferred embodiments of the present invention have been shown and described in detail, it should be understood that various changes and modifications may be made therein without departing from the scope of the appended claims.

What is claimed is:

1. A method of manufacturing products in a plurality of types having different specifications, the method comprising:
   a) manufacturing rolled medium products from intermediate products;
   b) rolling a medium;
   c) adding address information to the products, each address information uniquely identifying a respective intermediate product; and
   d) transferring the products together with the address information from a plurality of feed means to a common feed line via a transfer means;

wherein a sequence of the transferring in step d) is determined by
      storing a preceding address information in a memory associated with the transfer means, the preceding address information being the address information of a preceding one of the products that has been transferred to the common feed line, and
      transferring a subsequent one of the products selected from said plurality of feed means to the common feed line, the subsequent one of the products having address information in a predetermined sequential relationship to the preceding address information.

2. A method according to claim 1, wherein the address information comprises positional information on the intermediate products which become the products.

3. A method according to claim 1, wherein the rolled medium products comprise film rolls.

4. A method according to claim 1, wherein the intermediate products include cores and severed portions of a film blank.

5. A method according to claim 4, wherein said transferring of a subsequent one of the products is conducted after rolling the severed portions of the film blank.

6. A method according to claim 1, wherein the address information comprises slit numbers and block numbers.

7. A method according to claim 6, wherein the intermediate products comprise severed portions of a film blank, and
   wherein the slit numbers define portions of the film blank which are severed in a first direction and the block numbers define portions of the film blank which are severed in a second direction which is substantially perpendicular to the first direction.

8. A method of manufacturing products in a plurality of types having different specifications, the method comprising:
   a) manufacturing products from intermediate products;
   b) adding address information to the products, each address information uniquely identifying a respective intermediate product before the intermediate product is used in step a); and
   c) transferring the products together with the address information from a plurality of feed means to a single feed line via a transfer means;

wherein a sequence of the transferring in step c) is determined by
      storing a preceding address information in a memory associated with the transfer means, the preceding address information being the address information of a preceding one of the products that has been transferred to the single feed line, and
      transferring a subsequent one of the products to the single feed line, the subsequent one of the products having address information in a predetermined relationship to the preceding address information,
   wherein the address information comprises positional information on the intermediate products which become the products,
   wherein the positional information comprises slit numbers successively defined in a first direction of cut webs as said intermediate products and block numbers successively defined in a second direction which is substantially perpendicular to the first direction.

9. An apparatus for manufacturing products in a plurality of types having different specifications, the apparatus comprising:
   a plurality of feed means for feeding rolled medium products manufactured from intermediate products;

a common feed line for feeding said products fed by said feed means;

transfer means for transferring said products fed by said feed means to said common feed line;

address information holding means for holding address information that is associated with said products, each address information uniquely identifying a respective intermediate product;

preceding address information holding means for storing a preceding address information, said preceding address information being said address information of a preceding one of said products that has been transferred to said common feed line; and product selecting means for selecting a subsequent one of said products from said plurality of feed means to be transferred to said common feed line, said subsequent one of said products having address information in a predetermined sequential relationship to said preceding address information.

10. An apparatus according to claim 9, wherein said transfer means includes a plurality of transfer units.

11. An apparatus according to claim 9, wherein said address information comprises positional information on said intermediate products which become said products.

12. An apparatus according to claim 9, wherein said address information is added to said products when said products are manufactured from said intermediate products.

13. An apparatus according to claim 9, further including means for rolling the medium.

14. An apparatus according to claim 9, wherein said rolled medium products comprise film rolls.

15. An apparatus according to claim 9, wherein said intermediate products include cores and severed portions of a film blank.

16. An apparatus according to claim 15, wherein the transferring of a subsequent one of the products is conducted after rolling said severed portions of said film blank.

17. An apparatus according to claim 9, wherein said address information comprises slit numbers and block numbers.

18. An apparatus according to claim 17, wherein said intermediate products comprise severed portions of a film blank, and wherein said slit numbers define portions of said film blank which are severed in a first direction and said block numbers define portions of said film blank which are severed in a second direction which is substantially perpendicular to the first direction.

* * * * *